United States Patent
Ryu et al.

(10) Patent No.: US 9,578,651 B2
(45) Date of Patent: Feb. 21, 2017

(54) SCHEME FOR D2D COMMUNICATION USING PRIORITY

(71) Applicant: Samsung Electronics Co., Ltd., Suwon-si, Gyeonggi-do (KR)

(72) Inventors: Hyun-Seok Ryu, Yongin-si (KR); Seung-Hoon Park, Seoul (KR); Chi-Woo Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 197 days.

(21) Appl. No.: 14/266,200

(22) Filed: Apr. 30, 2014

(65) Prior Publication Data

US 2014/0321377 A1 Oct. 30, 2014

(30) Foreign Application Priority Data

Apr. 30, 2013 (KR) .................. 10-2013-0047866

(51) Int. Cl.
| | |
|---|---|
| *H04W 72/10* | (2009.01) |
| *H04W 72/12* | (2009.01) |
| *H04W 72/04* | (2009.01) |
| *H04W 72/08* | (2009.01) |
| *H04W 76/00* | (2009.01) |

(52) U.S. Cl.
CPC ....... *H04W 72/1247* (2013.01); *H04W 72/10* (2013.01); *H04W 72/042* (2013.01); *H04W 72/048* (2013.01); *H04W 72/085* (2013.01); *H04W 72/1231* (2013.01); *H04W 76/002* (2013.01)

(58) Field of Classification Search
CPC ............ H04W 72/1247; H04W 72/10; H04W 72/042; H04W 72/048; H04W 72/085; H04W 72/1231
USPC .......................................................... 370/329
See application file for complete search history.

(56) References Cited

U.S. PATENT DOCUMENTS

| | | | | |
|---|---|---|---|---|
| 9,198,162 | B2 * | 11/2015 | Van Phan | ............. H04W 72/04 |
| 2004/0127225 | A1 * | 7/2004 | Qiu | ........................ H04W 28/26 455/450 |
| 2010/0272029 | A1 | 10/2010 | Laroia et al. | |
| 2010/0272081 | A1 | 10/2010 | Laroia et al. | |
| 2011/0268026 | A1 * | 11/2011 | Ronneke | .......... H04W 72/1242 370/328 |

(Continued)

FOREIGN PATENT DOCUMENTS

| | | | | |
|---|---|---|---|---|
| FI | WO 2012160539 A1 * | 11/2012 | | ............ H04W 72/10 |
| WO | 2011-134553 A1 | 11/2011 | | |

(Continued)

*Primary Examiner* — Un C Cho
*Assistant Examiner* — Shah Rahman
(74) *Attorney, Agent, or Firm* — Jefferson IP Law, LLP

(57) ABSTRACT

A communication method of a device to device (D2D) user equipment (UE) in a cellular system supporting a communication frame structure including one or more subframes used for a communication of the D2D UE is provided. The method includes reading an alarm region located within a first subframe, wherein the alarm region indicates whether a communication signal having a priority is included in the first subframe or a second subframe related to the first subframe, and transmitting the communication signal through one of the second subframe and a third subframe related to the second subframe, based on information read from the alarm region.

22 Claims, 10 Drawing Sheets

(56) References Cited

U.S. PATENT DOCUMENTS

| | | | |
|---|---|---|---|
| 2011/0312331 A1* | 12/2011 | Hakola | H04W 72/085 455/452.2 |
| 2013/0012221 A1* | 1/2013 | Zou | H04W 72/10 455/452.1 |
| 2013/0028177 A1 | 1/2013 | Koskela et al. | |
| 2013/0040677 A1 | 2/2013 | Lee et al. | |
| 2013/0148566 A1* | 6/2013 | Doppler | H04W 72/005 370/312 |
| 2013/0288608 A1* | 10/2013 | Fwu | H04W 72/02 455/63.1 |
| 2014/0140296 A1* | 5/2014 | Choi | H04J 11/0036 370/329 |
| 2014/0185529 A1* | 7/2014 | Lim | H04W 76/023 370/328 |
| 2014/0219095 A1 | 8/2014 | Lim et al. | |
| 2014/0321423 A1* | 10/2014 | Kalhan | H04W 76/023 370/330 |
| 2015/0071207 A1* | 3/2015 | Seo | H04W 76/023 370/329 |
| 2015/0173048 A1* | 6/2015 | Seo | H04W 72/1247 370/329 |
| 2015/0365992 A1* | 12/2015 | Lim | H04B 17/318 370/329 |

FOREIGN PATENT DOCUMENTS

| | | |
|---|---|---|
| WO | 2011-158141 A1 | 12/2011 |
| WO | 2013-028044 A2 | 2/2013 |

* cited by examiner

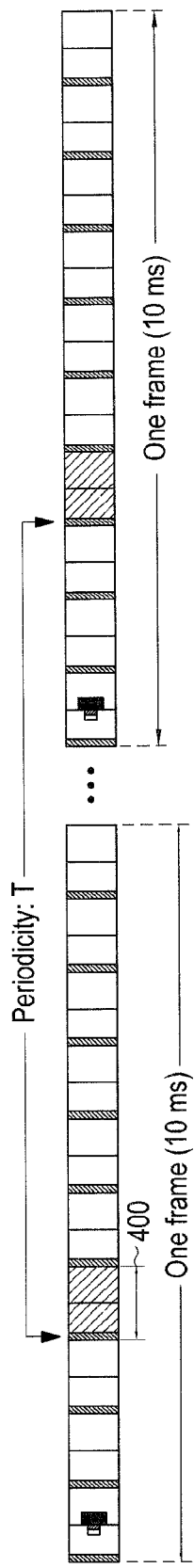
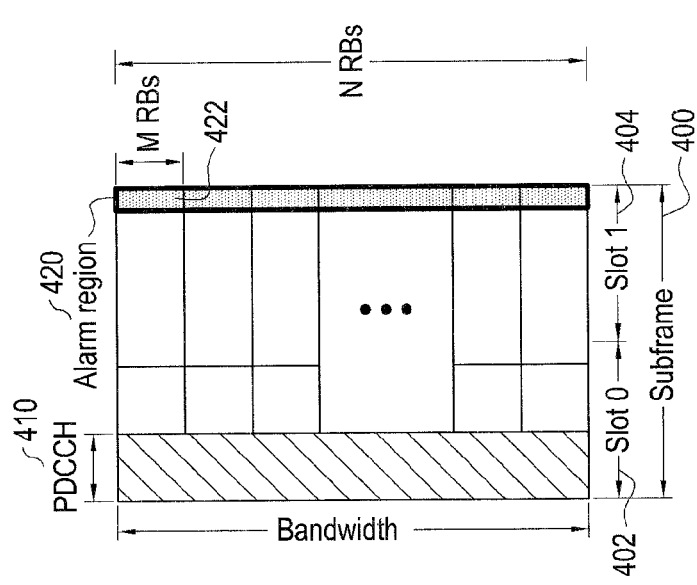
FIG.4A
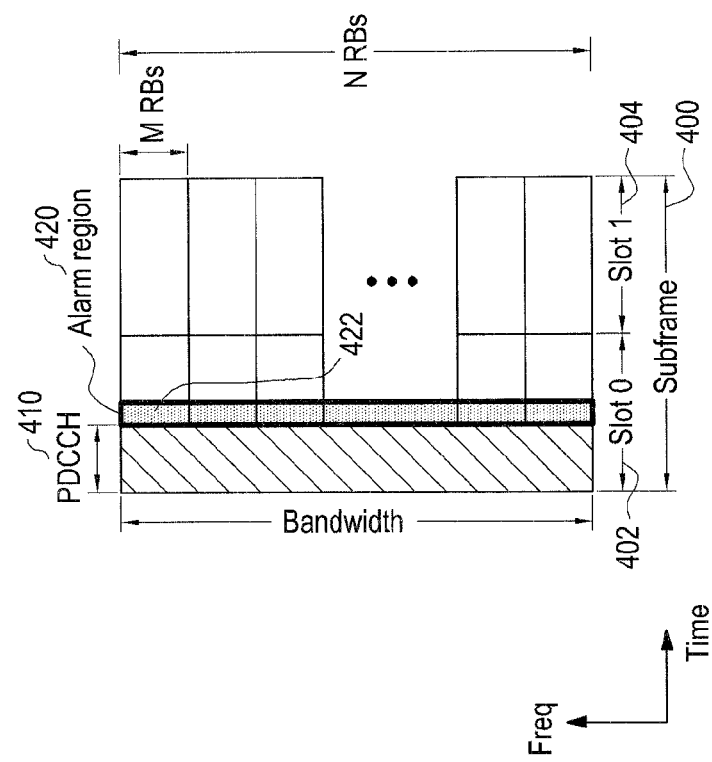
FIG.4B
FIG.4C

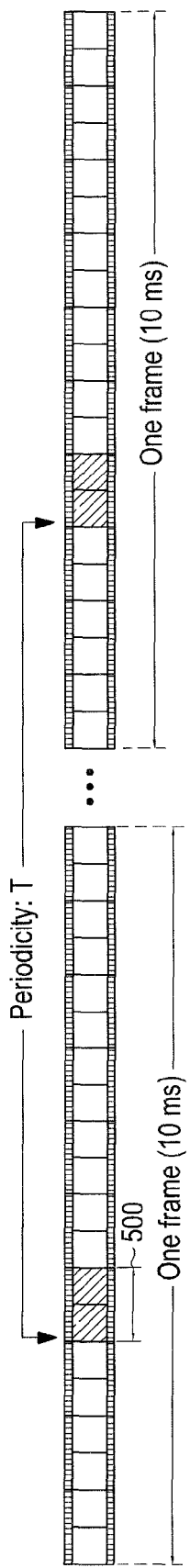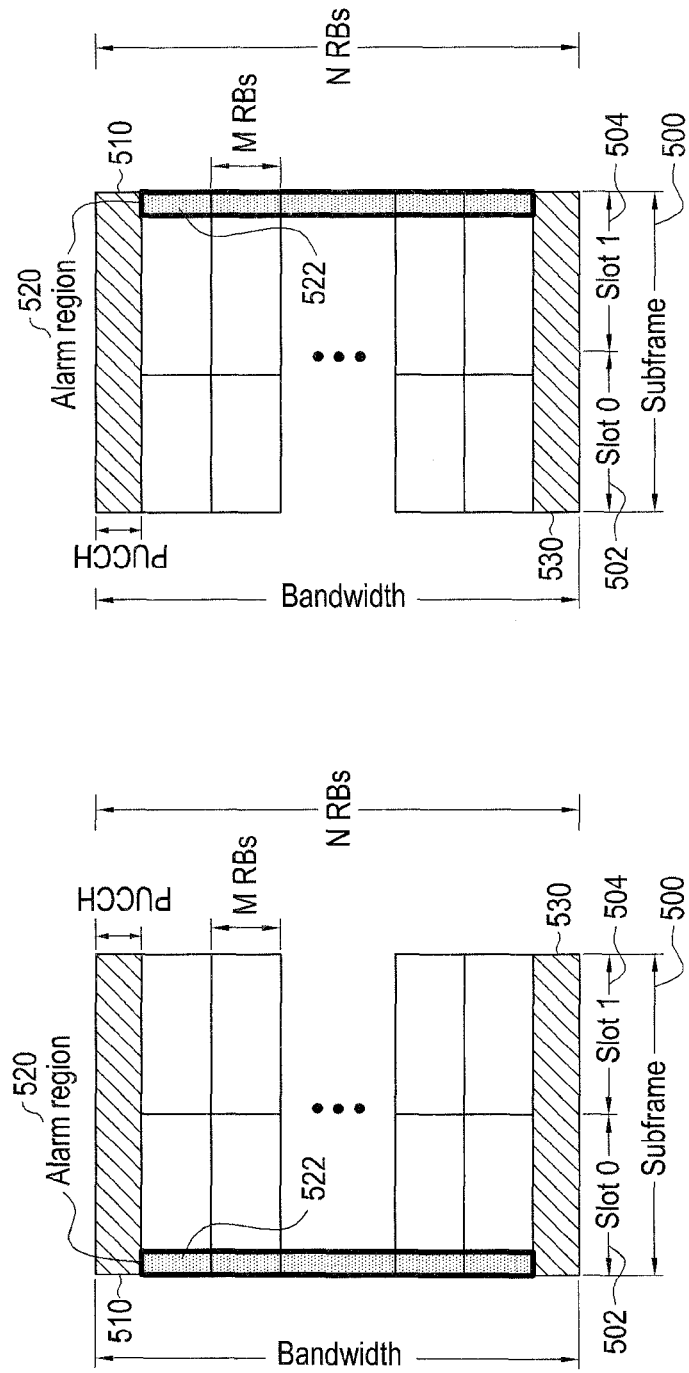
FIG.5A
FIG.5B
FIG.5C

SCHEME FOR D2D COMMUNICATION USING PRIORITY

CROSS-REFERENCE TO RELATED APPLICATION(S)

This application claims the benefit under 35 U.S.C. §119(a) of a Korean patent application filed on Apr. 30, 2013 in the Korean Intellectual Property Office and assigned Serial number 10-2013-0047866, the entire disclosure of which is hereby incorporated by reference.

TECHNICAL FIELD

The present disclosure relates to a Device to Device (D2D) communication. More particularly, the present disclosure relates to a method of operating D2D resources to handle a preferential D2D communication of a User Equipment (UE) having a higher priority.

BACKGROUND

With the acceleration of the adoption of the use of smart phones, various application services using the smart phone are being activated and such an aspect of smart phone use is expected to be accelerated more and more in the future. Accordingly, various technologies have arisen to effectively prevent data congestion due to the various application services in a cellular system. For example, according to the use of high capacity mobile contents, a Device to Device (D2D) communication to efficiently distribute loads of a base station by using proximity of mobile communication terminals is spotlighted. The D2D communication is being standardized by the 3rd Generation Partnership Project (3GPP) Radio Access Network (RAN) Technical Specification Group (TSG).

The D2D communication which forms and maintains a D2D communication network by allowing terminals to distributively use limited radio resources, without assistance of the network such as from the base station, may include operations including synchronization, peer discovery, paging, data traffic communication, and the like. In the synchronization operation, basic time and frequency are synchronized between terminals through a Global Positioning System (GPS) or the like. In the peer discovery operation, each terminal identifies geographically proximate neighboring terminals through broadcast terminal information. In the paging operation, a D2D link for unidirectional transmission between terminals which desire communication is formed. In the traffic communication operation, link scheduling and data transmission according to the link scheduling are performed based on the formed link through the above operations.

A D2D Proximity Service (ProSe) may be largely classified into a D2D discovery and direct communication. The D2D discovery refers to a process in which a particular terminal recognizes another terminal located near the terminal. The direct communication refers to a process in which terminals directly communicate with each other without passing through the base station, unlike the conventional cellular system in which the terminals communicate with each other via the base station.

The D2D communication may be classified into a network communication and a direct communication. Further, the D2D discovery may be classified into a network discovery and a direct discovery.

In the network communication (or discovery), the network (or base station) is involved in a series of all processes related to a communication (discovery) of the terminal That is, the base station may dynamically allocate a chunk of resources required for the communication (discovery) in every scheduling period and the network is involved in the communication (discovery) in a centralized manner in which the base station selects Resource Blocks (RBs) to be used by terminals which actually transmit/receive communication (discovery) signals.

Meanwhile, in the direct communication (discovery), a role of the network is minimized. That is, the base station statically allocates a chunk of resources required for the communication (discovery) and terminals to perform the communication (discovery) within the allocated chunk of resources select RBs required for the communication (discovery) in a distributed manner and transmit communication (discovery) signals.

Each terminal is required to transmit the communication (discovery) signal for the direct communication (discovery). Terminals which desire to transmit the communication (discovery) signal select one or more RBs from the RBs existing in a corresponding subframe and transmit the communication (discovery) signal. Since each terminal does not know which terminal transmits which signal, the terminal is required to select a resource for transmitting the communication (discovery) signal before transmitting the communication (discovery) signal.

A Greedy approach may be applied as an example of a method of selecting an RB for direct communication (discovery) signal transmission. The Greedy approach corresponds to a method in which the User Equipment (UE) receives communication (discovery) signals for a predefined communication (discovery) interval, measures energy levels of all RBs within the communication (discovery) interval, and randomly selects one of the RBs which has an energy level within the bottom x % (for example, 5%). The terminal transmits the communication (discovery) signal to the selected RB.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below.

The Device to Device (D2D) resources can be spatially reused through the Greedy approach. However, the Greedy approach does not handle priorities of communication (discovery) signals, and thus cannot support a situation where the communication (discovery) of the User Equipment (UE) has the priority. For example, it may be determined that the communication (discovery) in Public Safety (PS), disaster, or emergency situations has a higher priority in comparison with the communication (discovery) for the commercial use (for example, store position information advertisement, sharing department store sale information, finding an empty taxi, collecting information on adjacent famous restaurants, and the like).

Even when the D2D communication is dedicated to the commercial use, it is required to support the communication (discovery) priority according to a service type of the terminal, but a conventional method cannot provide a management of the priority for each service type.

Accordingly, an aspect of the present disclosure is to provide a method, an apparatus, and a system for providing a priority in a D2D communication.

Further, an aspect of the present disclosure is to provide a scheme of selecting a Resource Block (RB) used for transmitting a D2D communication signal which can support a priority.

Moreover, as aspect of the present disclosure is to provide a resource structure which allows a terminal to recognize the existence of the communication priority in selecting a resource used in the D2D communication.

Another aspect of the present disclosure is to provide a detailed operation method of the resource structure used for recognizing the communication priority in the D2D communication.

In accordance with an aspect of the present disclosure, a communication method of a D2D UE in a cellular system supporting a communication frame structure including one or more subframes used for a communication of the D2D UE is provided. The method includes reading an alarm region located within a first subframe, wherein the alarm region indicates whether a communication signal having a priority is included in the first subframe or a second subframe related to the first subframe, and transmitting the communication signal through one of the second subframe and a third subframe related to the second subframe based on information read from the alarm region.

In accordance with another aspect of the present disclosure, a communication method of a D2D UE in a cellular system supporting a communication frame structure including one or more subframes used for a communication of the D2D UE is provided. The method includes reading an alarm region located within a first subframe, wherein the alarm region indicates whether a communication signal having a priority is included in the first subframe or a second subframe related to the first subframe, and transmitting the communication signal through one of the second subframe and a third subframe related to the second subframe based on information read from the alarm region, wherein the alarm region is divided and allocated to be used for each of one or more priorities and the transmitting of the communication signal includes marking an alarm region allocated to a priority of the UE, and transmitting the communication signal in a transport resource associated with the marked alarm region.

In accordance with another aspect of the present disclosure, a communication method of a D2D UE in a cellular system supporting a communication frame structure including one or more subframes used for a communication of the D2D UE is provided. The method includes reading an alarm region located within a first subframe, wherein the alarm region indicates whether a communication signal having a priority is included in the first subframe or a second subframe related to the first subframe, and transmitting the communication signal through one of the second subframe and a third subframe related to the second subframe based on information read from the alarm region, wherein the reading of the alarm region comprises detecting whether sequences designated to one or more priorities are marked on the alarm regions.

In accordance with another aspect of the present disclosure, a UE performing a communication in a cellular system supporting a communication frame structure including one or more subframes used for the communication of a D2D UE is provided. The UE includes a transceiver that transmits and receives a communication frame, and a controller that reads an alarm region located within a first subframe, the alarm region indicating whether a communication signal having a priority is included in the first subframe or a second subframe related to the first subframe, and controls to transmit the communication signal through one of the second subframe and a third subframe related to the second subframe based on information read from the alarm region.

In accordance with another aspect of the present disclosure, a UE performing a communication in a cellular system supporting a communication frame structure including one or more subframes used for the communication of a D2D UE is provided. The UE includes a transceiver that transmits and receives a communication frame, and a controller that reads an alarm region located within a first subframe, the alarm region indicating whether a communication signal having a priority is included in the first subframe or a second subframe related to the first subframe, and controls to transmit the communication signal through one of the second subframe and a third subframe related to the second subframe based on information read from the alarm region, wherein the alarm region is divided and allocated to be used for each of one or more priorities and the controller further marks an alarm region allocated to a priority of the UE, and controls to transmit the communication signal in a transport resource associated with the marked alarm region.

In accordance with another aspect of the present disclosure, a UE performing a communication in a cellular system supporting a communication frame structure including one or more subframes used for the communication of a D2D UE is provided. The UE includes a transceiver that transmits and receives a communication frame, and a controller that reads an alarm region located within a first subframe, the alarm region indicating whether a communication signal having a priority is included in the first subframe or a second subframe related to the first subframe, and controls to transmit the communication signal through one of the second subframe and a third subframe related to the second subframe based on information read from the alarm region, wherein the controller detects whether sequences designated to one or more priorities are marked on the alarm regions.

When there are communication priorities according to a communication type (for example, public safety, commercial use or the like) and a service class (for example, expensive payment system or cheap payment system), it is possible with the disclosed embodiments to efficiently support the communication priorities.

Further, expensive cellular resources can be efficiently used with the disclosed embodiments by minimizing an amount of resources reserved to deal with the priority, thus allowing a terminal having a relatively low priority to yield resources when a terminal having a higher priority performs the discovery.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 4A, 4B, and 4C illustrate an example of a structure of subframes allocated to a D2D discovery in a cellular DL channel according to an embodiment of the present disclosure;

FIGS. 5A, 5B, and 5C illustrate an example of a structure of subframes allocated to a D2D discovery in a cellular UL channel according to an embodiment of the present disclosure;

Throughout the drawings, it should be noted that like reference numbers are used to depict the same or similar elements, features, and structures.

DETAILED DESCRIPTION

Figure 1:
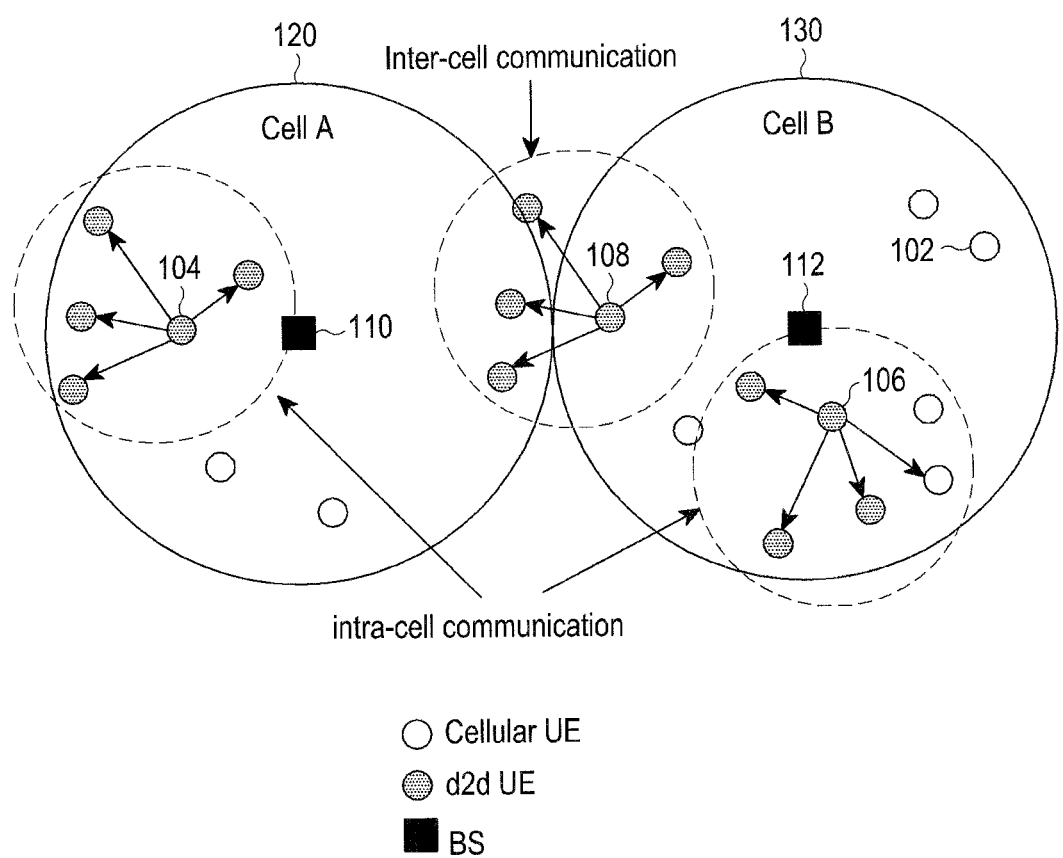
FIG. 1 illustrates an example of a cellular system in which a Device to Device (D2D) direct discovery is generated according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Prior to the detailed description, construable examples of some terms used herein will be first described below. However, it is noted that the terms are not limited to the examples of the construable meanings which are proposed below.

A Base Station (BS) is a main body communicating with a User Equipment (UE), and may be referred to as a BS, a Node B (NB), an evolved Node B (eNB), an Access Point (AP), and the like. Further, in the specification, the BS is used as an entity which represents various entities of a network. Particularly, the BS may dynamically allocate a chunk of resources required when the UE performs a discovery in every scheduling period. A size of the chunk may be one or more subframes within one radio frame or one or more Resource Blocks (RBs) within one subframe. In a centralized type discovery, the BS may select one or more resources to be used by UEs transmitting/receiving a discovery signal and also a pair of UEs to perform the discovery.

The User Equipment is a subject communicating with the BS, and may be referred to as a UE, a Mobile Station (MS), a Mobile Equipment (ME), a device, a terminal, and the like. Particularly, in the specification, a cellular terminal and a Device to Device (D2D) UE are distinguished. The cellular terminal refers to a UE communicating with another UE by using a cellular communication network, and the D2D UE refers to a UE performing a D2D direct discovery or D2D direct communication without a relay of the cellular communication network or any help. In the specification, the term "UE" may be construed as the D2D UE unless otherwise specifically stated.

The D2D communication of the present disclosure may include at least one of operations including synchronization, peer discovery, paging, data traffic communication, and the like. Furthermore, it should be noted that there is no limit in view of performing order of the operations in implementing the D2D communication. That is, a first case comprising synchronization and data traffic communication, a second case comprising synchronization, paging, and data traffic communication, and a third case comprising synchronization, discovery, and data traffic communication may be implemented. Therefore, through the present disclosure, a D2D communication of the present disclosure can be understood or treated as a D2D discovery.

Random resource selection of the present disclosure may be applied as another example of a method of selecting an RB for direct communication signal transmission. In this method, a UE selects an RB to transmit direct communication signal within the chunk of resources allocated by the base station.

A D2D resource of the present disclosure may include a D2D communication resource and a D2D discovery resource. For example, the D2D communication resource may operate based on a greedy approach method (i.e., energy sensing method) and the D2D discovery resource may operate based on random selection method.

FIG. 1 illustrates an example of a cellular system in which a D2D direct communication is generated according to an embodiment of the present disclosure.

Referring to FIG. 1, a UE indicated by an empty circle refers to a cellular UE 102 and a UE indicated by a shaded circle refers to a D2D UE 104, 106, or 108. Black squares refer to BSs 110 and 112 of a cell A 120 and a cell B 130, respectively.

The D2D UEs 104, 106, and 108 transmit communication (or discovery) signals to indicate a proximity of UEs existing adjacent to the D2D UEs 104, 106, and 108, and receive communication signals transmitted from other UEs. The communication signal may include communication information, and the communication information may include information for identifying the UE (for example, UE ID, UE Media Access Control (MAC) address, and cell ID), application ID information, service ID information, and the like.

The D2D UEs 104 and 106 perform an intra-cell communication within Cell A 120 and Cell B 130, respectively, and the D2D UE 108 performs an inter-cell communication.

Selection of resources required when each D2D UE transmits a communication signal is distributively made between UEs performing the communication, which will be described below in more detail. The D2D direct communication corresponds to a distributed manner made between UEs performing the communication and does not require significant assistance from the network.

The direct communication is advantageous in that it has small control overhead required for the communication as involvement of the network is minimized and can distributively perform the communication between UEs without requiring a separate control by the BS even in an area out of network coverage or in a coverage hole within network coverage.

Further, when a plurality of cells (specifically, corresponding BSs) statically allocate resources spent for the communication to support the direct communication, the network may configure to allow the plurality of cells to use a common resource for the communication. In this case, UEs included in different adjacent cells using the common resource may also easily perform the inter-cell communication.

Accordingly, the specification will describe the direct communication in detail and the terms "D2D communication" or "communication" as used hereinafter may be construed as the "D2D direct communication". Accordingly, the specification will describe the direct discovery in detail and the terms "D2D discovery" or "discovery" as used hereinafter may be construed as the "D2D direct discovery".

For example, a Long Term Evolution (LTE) cellular system allocates some of subframes included in UpLink (UL) or DownLink (DL) as independent resources only for D2D communication, and allows the UE to distributively (without any control or with a small control by the BS) communicate without special assistance from the BS within the allocated resources.

The BS within the cellular system may statically allocate separate resources for the communication of D2D UEs. Information on the resources is transmitted through a System Information Block (SIB) so that all D2D UEs within the cell can receive the information on the resources.

Figure 2:
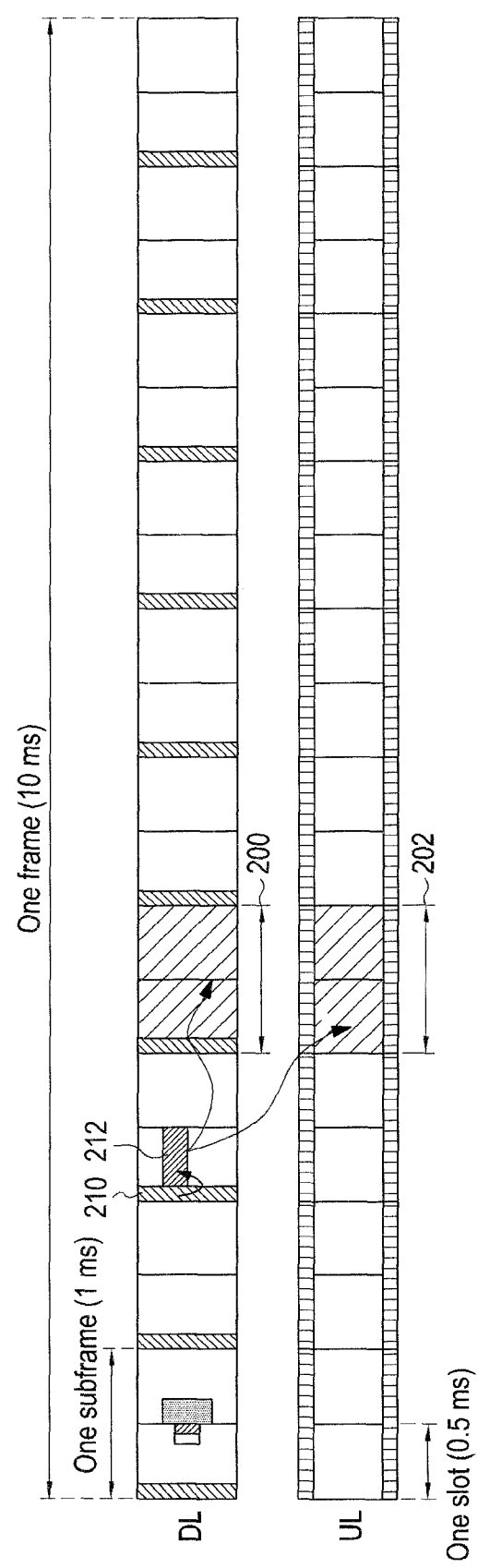
FIG. 2 illustrates an example of a structure of DownLink (DL) and UpLink (UL) frames according to an embodiment of the present disclosure.

FIG. 2 illustrates an example of a structure of DL and UL frames according to an embodiment of the present disclosure.

The UE may identify a frame 200 for a communication of a DL channel and a frame 202 for a communication of a UL channel by reading an SIB loaded on a Physical Downlink Shared CHannel (PDSCH) 212.

That is, the BS of the cellular system transmits information on resources allocated for the communication to the UE through the SIB. The SIB may include Mobile Network Operator (MNO) related information, UL cell bandwidth information, a random access parameter, and the like. The SIB may further include separate resources for the direct communication, that is, identification information of a subframe to be used for the communication (hereinafter referred to as a "communication subframe" or "discovery subframe" or "subframe").

The SIB may be transmitted through the PDSCH 212, and whether the SIB exists in the PDSCH 212 may be indicated by a Physical Downlink Control CHannel (PDCCH) 210. Accordingly, the UE identifies whether the SIB exists in the PDSCH 212 by reading the PDCCH 210 and identifies information on resources to be used for the communication (e.g., a position of the D2D subframe) by reading the SIB.

Figure 3:
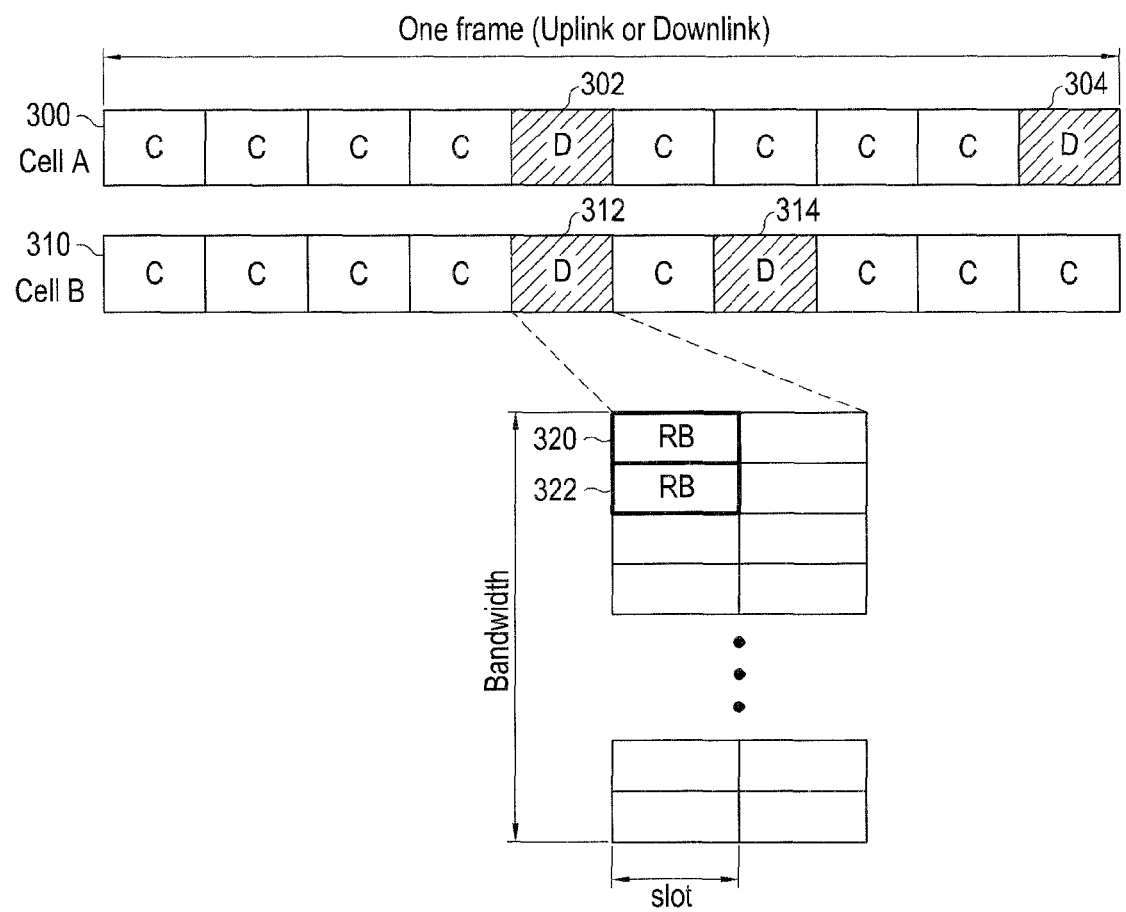
FIG. 3 illustrates an example of a frame structure to perform a D2D direct discovery in a cellular system according to an embodiment of the present disclosure.

FIG. 3 illustrates an example of a frame structure to perform the D2D direct communication in the cellular system according to an embodiment of the present disclosure.

A cell A allocates one or more particular subframes 302 and 304 for the D2D communication within one frame 300 and a cell B allocates one or more particular subframes 312 and 314 for the D2D communication within one frame 310 to make the subframes not overlap cellular resources used by the conventional cellular UEs within the cell. That is, the remaining subframes except for the subframes 302, 304, 312, and 314 (indicated by an initial "D") for the communication within the frames 300 and 310 of the cells A and B, respectively, may be cellular resources (indicated by an initial "C") used by the cellular UEs.

At this time, D2D subframes used by the respective cells may be the same, like the subframe 302 of the cell A and the subframe 312 of the cell B, or may be different, like the subframe 304 of cell A and the subframe 314 of the cell B. When the respective cells have the same subframe for the D2D communication, UEs included in different adjacent cells perform the communication by using the same resource, thereby performing the inter-cell communication.

The subframe (for example, subframe 312) for the D2D discovery includes a plurality of RBs 320 and 322, and a method in which each UE distributively (that is, without any control, or with only a small control, by the BS) selects resources for the discovery may follow a Greedy approach. That is, the UE desiring to perform the discovery monitors the subframe for the discovery for a predetermined time (for example, for several frames or a discovery period T). Further, the subframe for the D2D communication includes a plurality of RBs 320 and 322, and a method in which each UE distributively (that is, without any control, or with only a small control, by the BS) selects resources for the discovery may follow a random selection method. That is, the UE may randomly select an RB from RBs within the bottom x % (for example, the bottom 5%) of a low energy level and transmit a discovery signal to the selected RB.

As described above, allocating the subframes for the D2D communication alone cannot guarantee support of a priority of the communication between UEs, or support of a priority of the communication according to each service level.

Accordingly, the present disclosure provides an insertion of an alarm region, by which the UE can recognize a priority, into a subframe allocated for the communication. The alarm region indicates whether a communication signal having a predetermined priority is included in the subframe.

That is, a UE having a higher priority may inform other UEs that the UE itself has a predetermined priority and occupies particular communication resources (that is, one or more RBs) by using the alarm region. In the specification, the region for informing of the occupancy of the communication resources is named the alarm region, but the region may be named various modified titles, for example, a communication marking region, a communication header region, a communication preamble region, a communication common region, a communication information region, a discovery marking region, a discovery header region, a discovery preamble region, a discovery common region, a discovery information region, a marking region, a header region, a preamble region, a common region, an information region, and the like.

FIGS. 4A, 4B, and 4C illustrate an example of a structure of subframes allocated for the D2D communication in a cellular DL channel according to an embodiment of the present disclosure.

FIG. 4A illustrates frames of a DL channel for a periodicity T, that is, a period T between beginnings of subframes 400. FIG. 4A shows allocation of one D2D subframe 400 in one frame.

FIGS. 4B and 4C illustrate a detailed structure of the subframe 400.

As illustrated in FIG. 4B, an alarm region 420 may be located adjacent to a PDCCH 410. A first symbol 420, excluding the PDCCH 410, from a first slot 402 of the subframe 400, is a region for an alarm, that is, an alarm region 420. The alarm region 420 may include one or more sub alarm regions 422, and one sub alarm region 422 consists of M RBs on a frequency axis. That is, there are N/M sub alarm regions 422 in FIG. 4B. N denotes a number of RBs within a given bandwidth and is provided by the system, and M may be determined according to a size of communication information.

As illustrated in FIG. 4C, the alarm region 420 may be located at a last symbol of the subframe 400. That is, a last symbol 420 of a second slot 404 of the subframe 400 is the alarm region 420. The alarm region 420 may include one or more sub alarm regions 422, and one sub alarm region 422 consists of M RBs on a frequency axis. That is, there are N/M sub alarm regions in FIG. 4C. N denotes a number of RBs within a given bandwidth and is provided by the system, and M may be determined according to a size of communication information.

FIGS. 5A, 5B, and 5C illustrate an example of a structure of subframes allocated for the D2D communication in a cellular UL channel according to an embodiment of the present disclosure.

FIG. 5A illustrates frames of a UL channel for a periodicity T. FIG. 5A shows allocation of one D2D subframe 500 in one frame.

FIGS. 5B and 5C illustrate a detailed structure of the subframe 500.

Referring to FIG. 5B, an alarm region 520 is located at a first symbol of the D2D subframe. A region excluding Physical Uplink Control CHannels (PUCCHs) 510 and 530 from the first symbol of a first slot 502 is a region for an alarm, that is, an alarm region 520. The alarm region 520 may include one or more sub alarm regions 522, and one sub alarm region 522 consists of M RBs on a frequency axis. That is, there are (N−P)/M sub alarm regions in FIG. 5B, where P denotes a number of RBs included in the PUCCHs 510 and 530 in uplink. N is a value given according to a system bandwidth (a total number of RBs included in the system bandwidth), and M may be determined according to a size of communication information. Meanwhile, P is a system parameter.

Referring to FIG. 5C, the alarm region 520 is located at a last symbol of the D2D subframe.

A region excluding the PUCCHs 510 and 530 from the last symbol of a last slot 504 is the alarm region 520. The alarm region 520 may include one or more sub alarm regions 522 and one sub alarm region 522 consists of M RBs on a frequency axis. That is, there are (N−P)/M sub alarm regions in FIG. 5C, where P denotes a number of RBs included in the PUCCHs 510 and 530 in uplink. N is a value given according to a system bandwidth (a total number of RBs included in the system bandwidth), and M may be determined according to a size of communication information. Meanwhile, P is a system parameter.

Hereinafter, both the alarm region 420 or 520 and the sub alarm region 422 or 522 will be referred to as the "alarm region" without any distinction unless the distinction is necessarily required.

Figure 6:
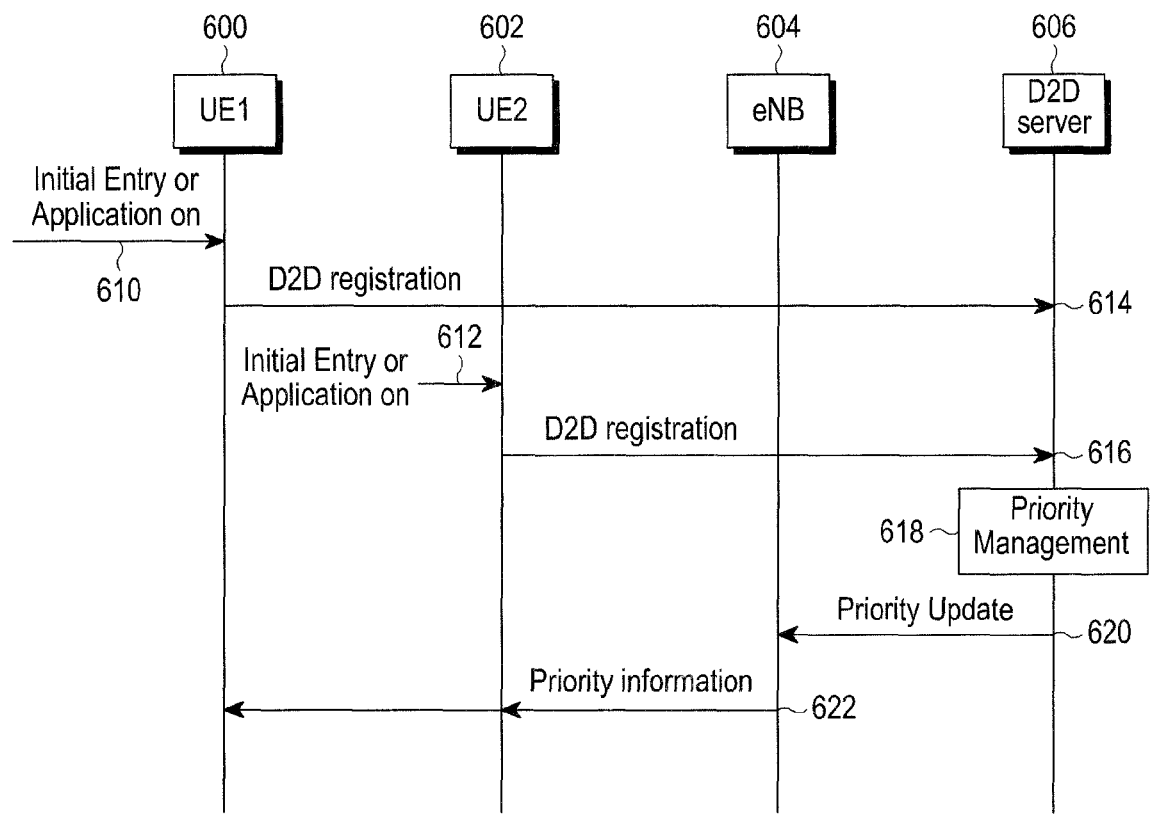
FIG. 6 illustrates a process in which a D2D User Equipment (UE) obtains a priority according to an embodiment of the present disclosure.

FIG. 6 illustrates a process in which the D2D UE obtains a priority according to an embodiment of the present disclosure.

In a network initial entry, a capability negotiation between the UE and the network, or an execution of a D2D related application, D2D UEs may receive information related to a priority of the communication from the network.

The information related to the priority of the UE may have values as shown in Table 1 and Table 2 below as an example.

TABLE 1

| Class | Service Type | Distance | Delay | Priority |
|---|---|---|---|---|
| 1 | Advertisement | <50 m | <400 ms | 3 |
| 2 | Game | <50 m | <300 ms | 2 |
| 3 | SNS(Social Network Service) | <100 m | <200 ms | 2 |
| 4 | Public Safety | <1 km | <50 ms | 1 |

TABLE 2

| Class | Billing type | Distance | Delay | Priority |
|---|---|---|---|---|
| 1 | $100/month | <1 km | <50 ms | 1 |
| 2 | $80/month | <500 m | <200 ms | 2 |
| 3 | $60/month | <200 m | <200 ms | 2 |
| 4 | $40/month | <200 m | <300 ms | 3 |

In Table 1, a service type such as "public safety" has a highest priority (priority 1) over other commercial service types (advertisements, games, SNS, and the like), and accordingly, should guarantee a widest effective communication distance and a shortest delay time. The examples in Table 1 are listed from a lowest priority (priority 3) to a highest priority (priority 1).

Table 2 shows that a UE having an expensive payment system receives a priority which guarantees a wide effective communication distance and a short delay time. The examples in Table 2 are listed from a highest priority (priority 1) to a lowest priority (priority 3).

FIG. 6 will be described in detail below. When the network initial entry, the capability negotiation between the UE and the network, or the execution of the D2D related application is generated as indicated by reference numerals 610 and 612, D2D UEs 600 and 602 may transmit D2D registration requests 614 and 616, respectively, to a D2D server 606 through the network. The D2D server 606, having received the D2D registration requests 614 and 616, may perform a priority management as indicated by a reference numeral 618, and may transmit priority update information to an eNB 604 as indicated by a reference numeral 620. The eNB 604 transmits communication priority information of each UE included in the priority update information to the D2D UEs in a unicasting/multicasting/broadcasting method, as indicated by reference numeral 622.

The D2D server 606 is a predetermined entity which can analyze priorities of applications being executed in the D2D UEs 600 and 602. An application server or a priority handler may perform the function of the D2D server 606. That is, the D2D server 606 may determine classes of the communication according to the applications of the D2D UEs 600 and 602 and may provide the determined classes to the D2D UEs 600 and 602. The D2D server 606 may be located within an entity such as a Mobility Management Entity (MME), a Home Subscriber Server (HSS), a Serving Gateway (S-GW), a Packet Data Network (PDN) Gateway (P-GW), or a location server (that is, such an entity may perform the operation of the D2D server), or may exist as a separate entity in the network.

Figure 7:
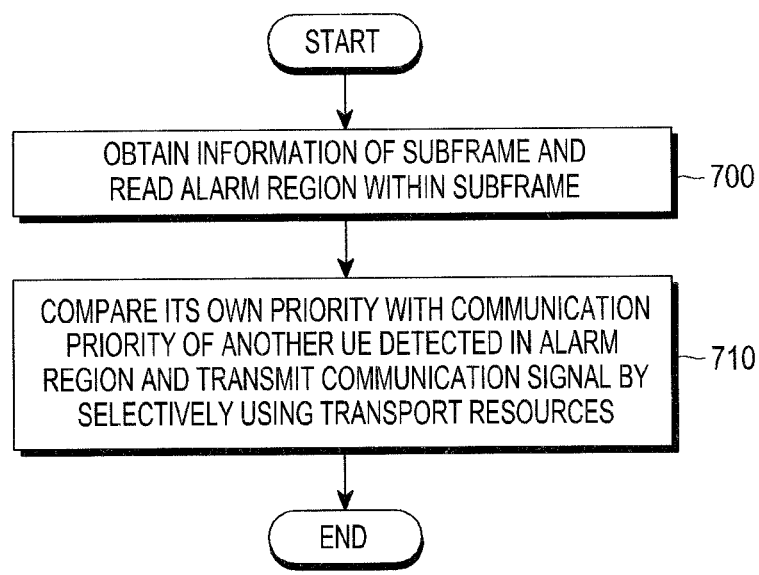
FIG. 7 illustrates a discovery method of a D2D UE according to an embodiment of the present disclosure.

FIG. 7 illustrates a communication method of the D2D UE according to an embodiment of the present disclosure.

As previously illustrated in FIG. 6, the UE already knows its own priority by receiving the priority of the communication from a particular entity (for example, D2D server) located in the network and receiving information on the priority through the eNB.

The D2D UE obtains information on subframes through reading the SIB and reads the alarm region within the subframes in operation 700.

The UE compares its own priority with a communication priority of another UE detected in the alarm region and transmits a communication signal by selectively using transport resources according to a result of the comparison in operation 710.

When the UE determines that there is a communication signal of another UE having a higher communication priority than that of itself as a result of the comparison, the UE may transmit the communication signal in the remaining transport resources except for a transport resource in association with the alarm region where the priority is detected, or may refrain from performing the operation of transmitting the communication signal. As described above, it is possible to guarantee a success of the preferential communication of the UE (or application) having the higher priority by preventing the transport resource of the communication signal having a higher priority from being used by the communication signal having a lower priority.

When the UE determines that there is a communication signal having the same priority as that of the UE in the alarm region, the UE may select a transport resource according to the aforementioned Greedy approach and transmit a communication signal.

Figure 8:
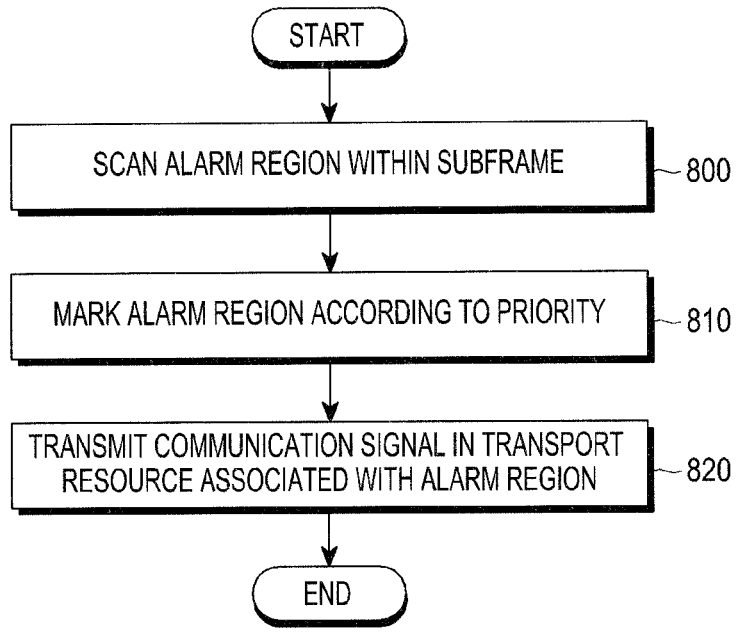
FIG. 8 illustrates an example of a method in which a UE transmits a discovery signal according to an embodiment of the present disclosure.

FIG. 8 illustrates an example of a method in which the UE transmits a communication signal according to an embodiment of the present disclosure.

An operation performed when the D2D UE which knows its own communication priority transmits a communication signal will be described with reference to FIG. 8. For example, the following operations may be detailed examples of the operation described in FIG. 7.

The UE scans the alarm region within the subframes in operation 800.

The UE has previously obtained the information on the D2D resource region (subframe) by receiving the SIB. Based on the obtained information, the UE scans the alarm region included in the resource region (for example, an x-th subframe). Scanning the alarm region may correspond to an operation of checking energy levels of RBs existing in the alarm region or an operation of calculating a correlation to detect whether sequences differently designated according to the priority are used for marking the alarm region. The alarm region may be located at a first symbol (e.g., the head or just after the PDCCH) of the subframe, or at a last symbol (e.g., the end) of the subframe, and information on the resource region transmitted through the SIB may further include information indicating a position of the alarm region.

The UE performs a marking on the alarm region according to its own communication priority in operation 810.

Through the marking, the UE may inform another UE that the UE transmits the communication signal in the subframe. Another UE may recognize a fact that the UE occupies the resource by scanning the marked RB in the alarm region of the subframe.

For example, the UE may sort energy levels of the alarm regions corresponding to its own priority in the alarm regions by using a result of the scan. The UE may select one or more RBs having the energy level within a bottom x % in the alarm region corresponding to its own priority and perform a marking on the selected RBs in a next subframe of the scanned subframe. When an amount of communication information to be transmitted is large, the UE may select a large number of RBs and use the selected RBs for transmitting the communication signal. Herein, "x" denotes a predetermined threshold, and may be determined by the system, for example, a value of "5". As a result of the scan, when a particular RB has a low energy level, this indicates that another UE has not transmitted the communication signal through the particular RB, or that another UE is spaced far apart from the UE even though another UE has transmitted the communication signal. That is, the UE can increase a success rate of the transmission of the communication signal by selecting an RB having a low energy level.

Alternatively, when a sequence having a higher priority than the priority of the UE is not marked as a result of the scan, the UE may select one or more RBs in a next subframe of the scanned subframe and perform a marking by using a sequence corresponding to its own priority.

The UE transmits the communication signal to a transport resource associated with the marked alarm region in operation 820.

The UE may transmit the communication signal to a transport resource of the subframe including the marked RB, or a transport resource of a next subframe of the subframe including the marked RB. At this time, the UE transmits the communication signal by using a transport resource associated with the marked alarm region. When energy levels of the alarm region of the priority of the UE and other priorities are measured as a value equal to or lower than a predetermined threshold (i.e., a lower energy level), the communication signal may be transmitted using a transport resource associated with the alarm region of the other priorities without marking the alarm region of the other priorities. The transport resource associated with the alarm region will be described with reference to FIGS. 9 to 12.

Hereinafter, a method of operating the alarm region within the subframe according to the communication priority of the UE and a method of operating a transport resource associated with the alarm region will be described.

According to an embodiment of the present disclosure, RBs included in the alarm region may be different according to the communication priority. That is, an alarm region which can be used for each priority may be separately allocated. Preferably, a larger number of alarm regions are used as the priority is higher and a smaller number of alarm regions are used as the priority is lower. In the specification, such a structure is named option-A, and an alarm region and a transport resource used for each priority (priority 1, priority 2, and priority 3) will be described as an example with reference to FIGS. 9 to 11 below.

Using a larger number of alarm regions for the communication of the UE (or service) having a higher priority increases an occupation probability of the transport resource associated with the alarm region and thus increases a success probability of the communication. In some cases, a number of alarm regions to be used for each priority may vary. When there are few D2D UEs having the high priority within the cellular system, resources reserved for the high priority may be used for the low priority. For example, when D2D UEs perform an initial access with the eNB of the cell, the UEs may receive their own priorities from the eNB, or the UEs may inform the eNB of their own priorities and then receive confirmation from the eNB. As described above, when the eNB knows priorities of all D2D UEs existing within the cell managed by the eNB, the eNB may allocate resources by properly controlling a number of alarm regions to be used for each priority (for example, by reducing a number of alarm regions for the high priority and increasing a number of alarm regions for the low priority).

Figure 12:
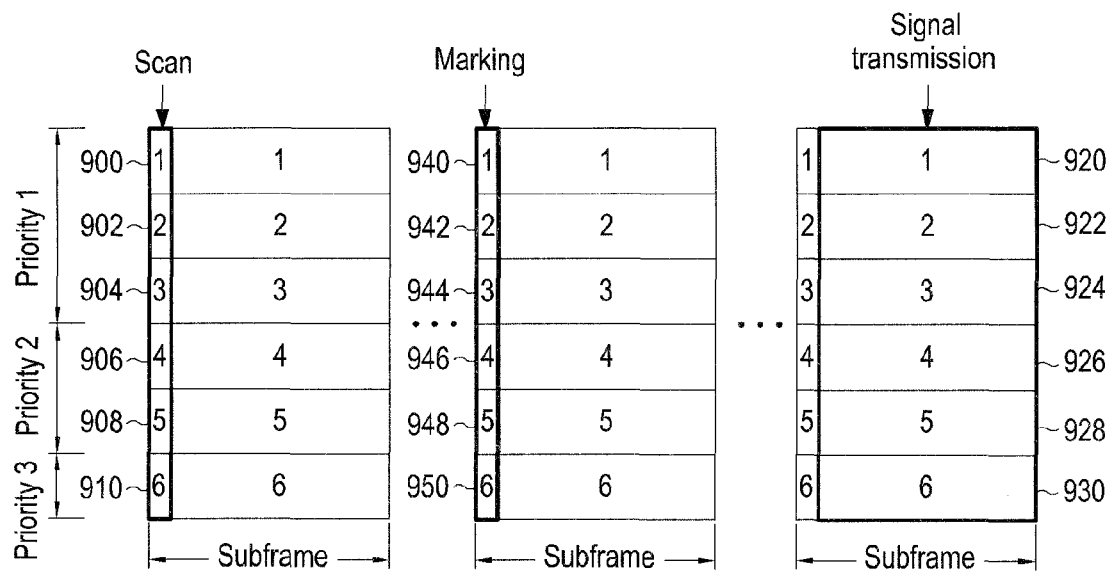
FIG. 12 illustrates a structure of a discovery subframe used for a discovery signal transmitting operation by a UE according to another embodiment of the present disclosure.

Meanwhile, according to an embodiment of the present disclosure, RBs included in the alarm region may be used regardless of the communication priority. In the specification, such a structure is named option-B. Unlike option-A, in option-B, the alarm regions are not distinguished according to the priority, and the UE has the entire alarm regions as candidates which can be marked, regardless of the UE's own priority, and selects a part of the alarm region as a target to be marked. The UE may use different sequences according to the communication priority to distinguish priorities. FIG. 12 illustrates an example of a method of distinguishing priorities by different sequences to operate alarm regions and transport resources.

Figure 9:
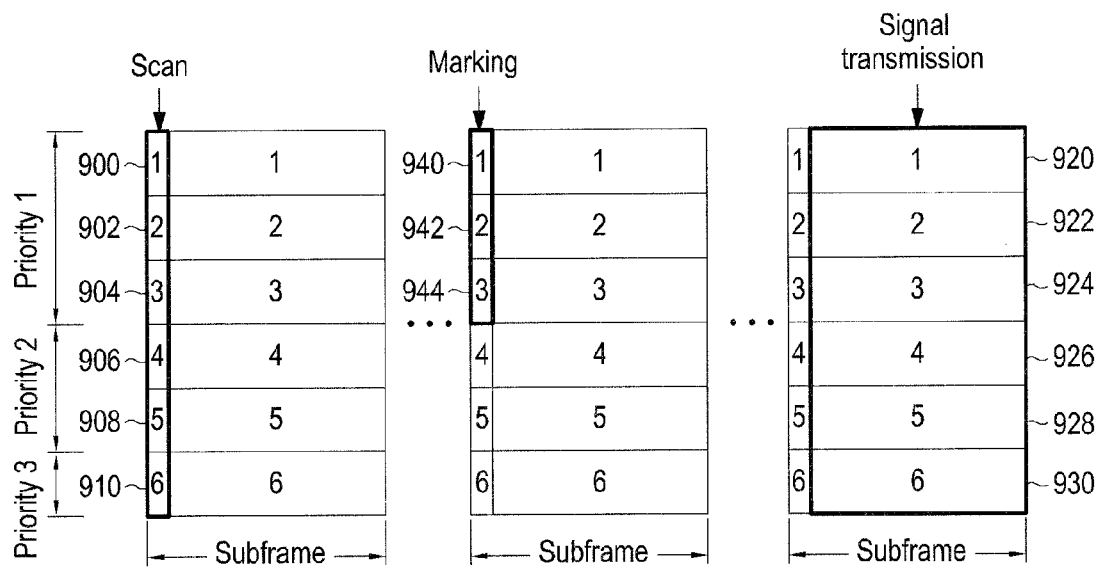
FIG. 9 illustrates a structure of a discovery subframe used for a discovery signal transmitting operation by a priority 1 UE according to an embodiment of the present disclosure.

FIG. 9 illustrates a structure of a subframe used for a communication signal transmitting operation by a priority 1 UE according to an embodiment of the present disclosure.

In option-A, available alarm regions are limited according to communication priorities of the D2D UEs. That is, the UE uses a larger number of alarm regions as the communication priority is higher, and uses a smaller number of alarm regions as the communication priority is lower. In the specification, although it is assumed that the communication priority has three classes for the convenience of description, the three classes may be expanded or reduced to K classes (K is an integer larger than 1). The priority 1 (highest priority) UE which desires to transmit a D2D communication signal performs the three operations illustrated in FIG. 8.

The UE scans energy levels of all alarm regions 900, 902, 904, 906, 908, and 910 located in the subframe in operation 800.

Although FIG. 9 illustrates that the alarm regions are located at a first symbol (particularly, a first symbol except for the PDCCH in DL) of the subframe, the alarm regions may instead be located at a last symbol of the subframe (see FIG. 4C and FIG. 5C).

The UE sorts energy levels of the alarm regions 900, 902, and 904 of priority 1 to randomly select one or more RBs having an energy level within the bottom x % (i.e., having an energy level equal to or lower than x %), and then marks the selected RB (specifically, an RB located at the same position as that of the selected RB) in the alarm regions 940, 942, and 944 of priority 1 of a next subframe of the subframe including the scanned alarm regions, in operation 810.

Although it has been illustrated for the convenience of description that the alarm regions of priority 1 are sequentially located from the top, the alarm regions may be randomly arranged within the entire alarm regions, without regard to the illustrated arrangement.

The UE transmits the communication signal to a transport resource associated with the alarm region of priority 1 in operation 820.

For example, the transport resource associated with the priority 1 alarm region indicated by a reference number 940 may be a no. 1 transport resource indicated by a reference number 920. That is, the UE having marked the RB of the no. 1 alarm region 940 may transmit the communication signal by using an RB within the no. 1 transport resource 920. The UE may transmit the communication signal by selectively using the transport resource (no. 1 transport resource adjacent to the no. 1 alarm region) included in the marked subframe and the transport resource 920 included in a next subframe of the marked subframe. Further, unlike the above description, a relation of "number of alarm regions: number of transport resources=1:1" is not established or a resource having a different number may be associated between the alarm region and the transport resource.

When energy equal to or lower than a particular threshold is received by other priority alarm regions (i.e., the priority 2 alarm region and priority 3 alarm region) except for the priority 1 alarm region, the UE may transmit the communication signal in the RB within the transport resources 926 and 928 (associated with the priority 2 alarm region) and the transport resource 930 (associated with the priority 3 alarm region) associated with the alarm regions which have received the energy equal to or lower than the particular threshold. The UE may transmit the communication signal without any marking on an alarm region (having a different priority) which has received the energy equal to or lower than the particular threshold. Further, when the UE detects the marking on the alarm region corresponding to the transport resource having the other priority in which the communication signal has been transmitted, the UE immediately stops transmitting the communication signal in the transport resource having the other priority. Accordingly, transmission of the communication signal according to the priority can be guaranteed.

Figure 10:
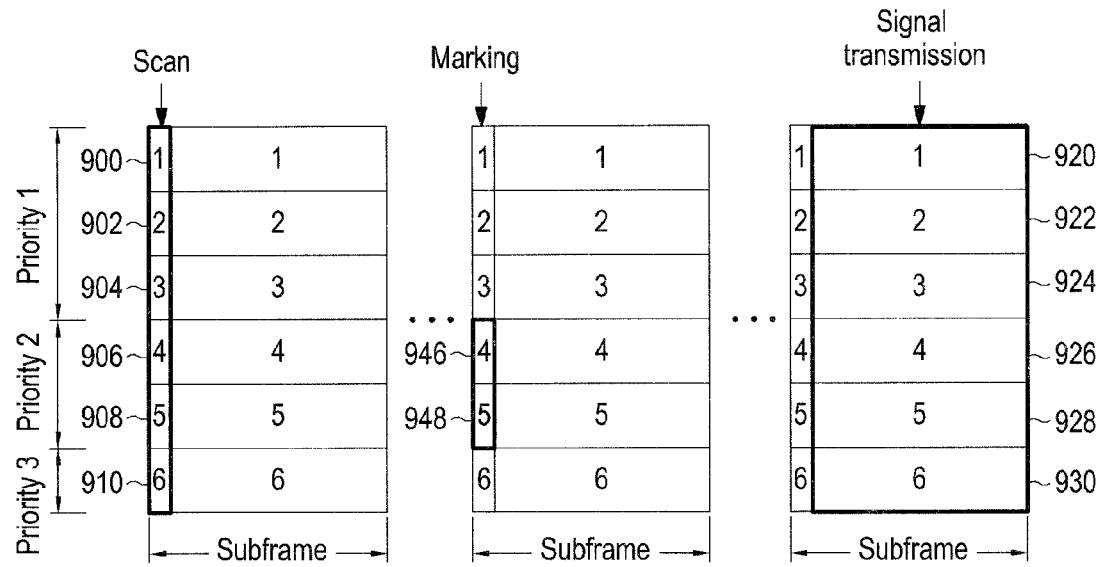
FIG. 10 illustrates a structure of a discovery subframe used for a discovery signal transmitting operation by a priority 2 UE according to an embodiment of the present disclosure.

FIG. 10 illustrates a structure of a subframe used for a communication signal transmitting operation by a priority 2 UE according to an embodiment of the present disclosure.

In option-A, available alarm regions are limited according to communication priorities of the D2D UEs. That is, the UE uses a larger number of alarm regions as the communication priority is higher and uses a smaller number of alarm regions as the communication priority is lower. In the specification, although it is assumed that the communication priority has three classes for the convenience of description, the three classes may be expanded or reduced to K classes (K is an integer larger than 1). The priority 2 (intermediate priority) UE which desires to transmit a D2D communication signal performs the three operations illustrated in FIG. 8.

The UE scans energy levels of all alarm regions 900, 902, 904, 906, 908, and 910 located in the subframe in operation 800.

Although FIG. 10 illustrates that the alarm regions are located at a first symbol (particularly, a first symbol except for the PDCCH in DL) of the subframe, the alarm regions may instead be located at a last symbol of the subframe (see FIG. 4C and FIG. 5C).

The UE sorts energy levels of the priority 2 alarm regions 906, 908 to randomly select one or more RBs having an energy level within the bottom x % (i.e., having an energy level equal to or lower than x %), and then marks the selected RB (specifically, an RB located at the same position as that of the selected RB) in priority 2 alarm regions 946 and 948 of a next subframe of the subframe including the scanned alarm regions in operation 810.

Although it has been illustrated for the convenience of description that the priority 2 alarm region is sequentially located adjacent to the priority 1 alarm region, the alarm regions may be randomly arranged within the entire alarm regions, without regard to the illustrated arrangement.

The UE transmits the communication signal to a transport resource associated with the priority 2 alarm region in operation 820.

For example, the transport resource associated with the priority 2 alarm region indicated by a reference number 946 may be a no. 4 transport resource indicated by a reference number 926. That is, the UE having marked the RB of the no. 4 alarm region 946 may transmit the communication signal by using the RB within the no. 4 transport resource 926. The UE may transmit the communication signal by selectively using the transport resource (no. 4 transport resource adjacent to the no. 4 alarm region) included in the marked subframe and the transport resource 926 included in a next subframe of the marked subframe. Further, unlike the above description, a relation of "number of alarm regions: number of transport resources=1:1" is not established or resources having different numbers from each other may be associated between the alarm region and the transport resource.

When energy equal to or lower than a particular threshold is received by other priority alarm regions (i.e., the priority 1 alarm region and priority 3 alarm region) except for the priority 2 alarm region, the UE may transmit the communication signal in the RB within the transport resources 920, 922, and 924 (associated with the priority 1 alarm region) and the transport resource 930 (associated with the priority 3 alarm region) associated with the alarm regions which have received the energy equal to or lower than the particular threshold. The UE may transmit the communication signal without any marking on an alarm region (having another priority) which has received the energy equal to or lower than the particular threshold. Further, when the UE detects the marking on the alarm region corresponding to the transport resource having the other priority in which the communication signal has been transmitted, the UE immediately stops transmitting the communication signal in the transport resource having the other priority. Accordingly, transmission of the communication signal according to the priority can be guaranteed.

Figure 11:
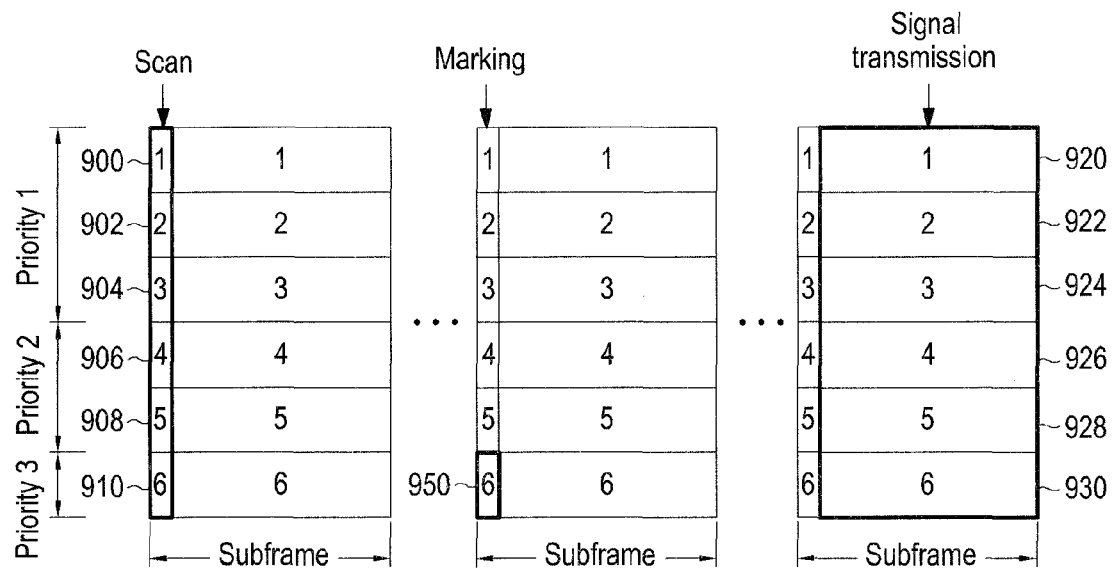
FIG. 11 illustrates a structure of a discovery subframe used for a discovery signal transmitting operation by a priority 3 UE according to an embodiment of the present disclosure.

FIG. 11 illustrates a structure of a subframe used for a communication signal transmitting operation by a priority 3 UE according to an embodiment of the present disclosure.

In option-A, available alarm regions are limited according to communication priorities of the D2D UEs. That is, the UE uses a larger number of alarm regions as the communication priority is higher, and uses a smaller number of alarm regions as the communication priority is lower. In the specification, although it is assumed that the communication priority has three classes for the convenience of description, the three classes may be expanded or reduced to K classes (K is an integer larger than 1). The priority 3 (i.e., lowest priority) UE which desires to transmit a D2D communication signal performs the three operations illustrated in FIG. 8.

The UE scans energy levels of all alarm regions 900, 902, 904, 906, 908, and 910 located in the subframe in operation 800.

Although FIG. 11 illustrates that the alarm regions are located at a first symbol (particularly, a first symbol except for the PDCCH in DL) of the subframe, the alarm regions may instead be located at a last symbol of the subframe (see FIG. 4C and FIG. 5C).

The UE sorts energy levels of the priority 3 alarm region 910 to randomly select one or more RBs having an energy level within the bottom x % (i.e., having an energy level equal to or lower than x %), and then marks the selected RB (specifically, an RB located at the same position as that of the selected RB) in a priority 3 alarm region 950 of a next subframe of the subframe including the scanned alarm region in operation 810.

Although it has been illustrated for the convenience of description that the priority 3 alarm region is sequentially located adjacent to the priority 1 alarm region and the priority 2 alarm region, the alarm regions may be randomly arranged within the entire alarm regions without regard to the illustrated arrangement.

The UE transmits the communication signal to a transport resource associated with the priority 3 alarm region in operation 820.

For example, the transport resource associated with the priority 3 alarm region indicated by a reference number 950 may be a no. 6 transport resource indicated by a reference number 930. That is, the UE having marked the RB of the no. 6 alarm region 950 may transmit the communication signal by using the RB within the no. 6 transport resource 930. The UE may transmit the communication signal by selectively using the transport resource (no. 6 transport resource adjacent to the no. 6 alarm region) included in the marked subframe and the transport resource 930 included in a next subframe of the marked subframe. Further, unlike the above description, a relation of "number of alarm regions: number of transport resources=1:1" is not established or a resource having a different number may be associated between the alarm region and the transport resource.

When energy equal to or lower than a particular threshold is received by the other priority alarm regions (i.e., the priority 1 alarm region and priority 2 alarm region) except for the priority 3 alarm region, the UE may transmit the communication signal in the RB within the transport resources 920, 922, and 924 (associated with the priority 1 alarm region) and the transport resource 926 (associated with the priority 2 alarm region) associated with the alarm regions which have received the energy equal to or lower than the particular threshold. The UE may transmit the communication signal without any marking on an alarm region (having another priority) which has received the energy equal to or lower than the particular threshold. Further, when the UE detects the marking on the alarm region corresponding to the transport resource having the other priority in which the communication signal has been transmitted, the UE immediately stops transmitting the communication signal in the transport resource having the other priority. Accordingly, transmission of the communication signal according to the priority can be guaranteed.

FIG. 12 illustrates a structure of a subframe used for a communication signal transmitting operation by the UE according to another embodiment of the present disclosure.

As described above, in option-B, the alarm regions are not distinguished according to the priority, and the UE has the entire alarm regions as candidates which can be marked regardless of its own priority and selects a part of the alarm regions as a target to be marked. For example, although the priority 1 UE may use nos. 1, 2, and 3 alarm regions 940, 942, and 944, the priority 2 UE may use nos. 4 and 5 alarm regions 946 and 948, and the priority 3 UE may use the no. 6 alarm region 950 in option-A, the priority 1 UE, the priority 2 UE, and the priority 3 UE may mark any alarm regions including the nos. 1 to 6 alarm regions 940, 942, 944, 946, 948, and 950 in option B. At this time, each of the UEs may mark one or more or entire alarm regions.

The UE may use different sequences according to the communication priority to distinguish priorities. That is, the communication priority may be determined by distinguishing sequences differently used according to the priority.

The sequence used for distinguishing the communication priorities may be an orthogonal sequence. For example, the orthogonal sequence may include a Walsh code or a Zadoff-Chu sequence. When the Walsh code is used, the communication priorities can be distinguished by designating and using one or more different orthogonal sequences generated when the Walsh code is created to the respective priorities. When the Zadoff-Chu sequence is used, the communication priorities can be distinguished by designating and using one or more different orthogonal sequences generated based on different cyclic shift parameters to the respective priorities.

The UE scans all alarm regions 900, 902, 904, 906, 908, and 910 located in the subframe in operation 800. Specifically, the UE searches for a set of all sequences which can be used in all the alarm regions 900, 902, 904, 906, 908, and 910 located in the subframe. For example, the UE may detect whether a particular sequence is used by taking a correlation with respect to a set of all sequences in all the alarm regions. Although FIG. 12 illustrates that the alarm regions are located at a first symbol (particularly, a first symbol except for the PDCCH in DL) of the subframe, the alarm regions may instead be located at a last symbol of the subframe (see FIG. 4C and FIG. 5C).

When a sequence having a higher priority than that of the UE is not detected in the alarm region, the UE performs a marking by using one or more of alarm regions 940, 942, 944, 946, 948, and 950 located in a next subframe of the subframe including the scanned alarm regions in operation 810. Specifically, the UE selects one or more alarm regions from the alarm regions 940, 942, 944, 946, 948, and 950 and performs the marking by using a sequence corresponding (designated) to its own priority in one or more RBs included in the selected alarm region.

The UE transmits the communication signal to a transport resource associated with the alarm region used for the marking in operation 820.

For example, a transport resource associated with the no. 1 alarm region indicated by the reference number 940 may be a no. 1 transport resource indicated by the reference number 920. That is, the UE having marked the RB of the no. 1 alarm region 940 may transmit the communication signal by using an RB within the no. 1 transport resource 920. The UE may transmit the communication signal by selectively using the transport resource (no. 1 transport resource just next to the no. 1 alarm region) included in the marked subframe and the transport resource 920 included in a next subframe of the marked subframe. Further, unlike the above description, a relation of "number of alarm regions: number of transport resources=1:1" is not established or a resource having a different number may be associated between the alarm region and the transport resource.

Meanwhile, when the UE detects the sequence having the higher priority than its own priority in the alarm regions 900, 902, 904, 906, 908, and 910 as a result of the scan in operation 800, the UE may not transmit the communication signal. In other words, when there is no detected sequence, or priorities designated to one or more detected sequences are not higher than the priority of the UE, as the result of the scan in operation 800, the UE may transmit the communication signal.

Accordingly, transmission of the communication signal according to the priority can be guaranteed.

Figure 13:
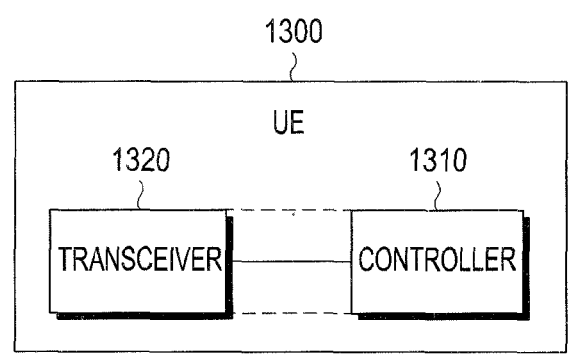
FIG. 13 illustrates an example of a configuration of a UE device according to an embodiment of the present disclosure.

FIG. 13 illustrates an example of a configuration of a UE device according to an embodiment of the present disclosure.

A UE device 1300 includes a transceiver 1320 that transmits and receives various signals and a controller 1310 that controls transmission and reception of a control channel and a communication signal through the transceiver 1320. The controller 1310 generally controls a communication signal transmitting operation of the terminal described in FIGS. 7 and 8 as well as the control of the transceiver 1320. Accordingly, performance of any operation by the UE can be equally understood as performance of any operation by the controller 1310 of the UE in the specification.

Although the transceiver 1320 and the controller 1310 may be implemented by separated modules, such as a Radio Frequency (RF) module and a processor, it should be noted that they can be implemented by a single module.

The controller 1310 may include a processor (not shown) and a memory (not shown), and the memory may store the communication signal transmitting/receiving operation in a form of instructions which can be read and executed by the processor.

It should be noted that the operation of the system, the structure and operation of the frame, and the operation of the UE illustrated in FIGS. 1 to 13 are not intended to limit the scope of the present disclosure. That is, all components, operations, or features included in FIGS. 1 to 13 are not required components for implementing embodiments and the various embodiments can be implemented with only a part of the illustrated components.

The components of the terminal, modules and the like used in the specification may operate by using a hardware circuit, for example, a combination of a complementary metal oxide semiconductor based logical circuit, firmware, software and/or hardware, and a combination of firmware and/or software inserted into a machine-readable medium. As an example, various electric configurations and methods may be carried out by using electric circuits such as transistors, logic gates, and an Application Specific Integrated Circuit (ASIC).

While the present disclosure has been shown and described with reference to various embodiments thereof, it will be understood by those skilled in the art that various changes in forms and details may be made therein without departing from the spirit and scope of the present disclosure as defined by the appended claims and their equivalents.

What is claimed is:

1. A communication method of a device to device (D2D) user equipment (UE) in a cellular system supporting a communication frame structure including one or more subframes used for a D2D communication of the D2D UE, the method comprising:

identifying an alarm region located within a first subframe, wherein the alarm region indicates whether a communication signal of another D2D UE having a priority is included in the first subframe or a second subframe related to the first subframe; and transmitting a communication signal of the UE through one of the second subframe and a third subframe related to the second subframe, wherein the first subframe and one of the second subframe or the third subframe, are used in the D2D communication of the UE, and wherein the identifying of the alarm region further comprises checking energy levels of entire alarm regions.

2. The method of claim 1, wherein the alarm region is divided and allocated according to one or more priorities.

3. The method of claim 2, wherein, with respect to the divided alarm regions, a larger number of alarm regions are allocated to a first priority than to a second priority, and wherein the first priority comprises a higher priority than the second priority.

4. The method of claim 2, wherein the transmitting of the communication signal comprises:

marking an alarm region allocated to a priority of the UE; and transmitting the communication signal in a transport resource associated with the marked alarm region.

5. The method of claim 4, wherein the marking of the alarm region comprises:

sorting alarm regions allocated to the priority of the UE in a descending order of the checked energy levels; and marking an alarm region having an energy level equal to or lower than a threshold.

6. The method of claim 5, wherein the threshold comprises an energy level percentage.

7. The method of claim 1, wherein the identifying of the alarm region comprises detecting whether sequences designated to one or more priorities are marked on the alarm regions.

8. The method of claim 7, wherein the transmitting of the communication signal comprises:

marking, when there is no detected sequence or when priorities designated to one or more detected sequences are not higher than a priority of the UE, a sequence designated to the priority of the UE on one or more of the alarm regions; and transmitting the communication signal in a transport resource associated with the marked alarm region.

9. The method of claim 8, further comprising:

obtaining, before the identifying of the alarm region, information indicating a position of the first subframe by reading a system information block (SIB) included within a communication frame.

10. The method of claim 8, wherein the alarm region is located at one of a first symbol, a first symbol except for a physical downlink control channel (PDCCH), or a last symbol, of the first subframe.

11. An user equipment (UE) performing a communication in a cellular system supporting a communication frame structure including one or more subframes used for a device to device (D2D) communication of the UE, the UE comprising:

a transceiver configured to transmit and receive a communication frame; and a controller configured to:

identify an alarm region located within a first subframe, the alarm region indicating whether a communication signal of another UE having a predetermined priority is included in the first subframe or a second subframe related to the first subframe, and control a transmission of a communication signal of the UE through one of the second subframe and a third subframe related to the second subframe, wherein the first subframe and one of the second subframe or the third subframe, are used in the D2D communication of the UE, and wherein the controller is further configured to identify the alarm region by checking energy levels of entire alarm regions.

12. The UE of claim 11, wherein the alarm region is divided and allocated according to one or more priorities.

13. The UE of claim 12, wherein, with respect to the divided alarm regions, a larger number of alarm regions are allocated to a first priority than to a second priority, and wherein the first priority comprises a higher priority than the second priority.

14. The UE of claim 12, wherein the controller is further configured to:

mark an alarm region allocated to a priority of the UE, and control a transmission of the communication signal in a transport resource associated with the marked alarm region.

15. The UE of claim 14, wherein the controller is further configured to:

sort alarm regions allocated to the priority of the UE in a descending order of the checked energy levels, and mark an alarm region having an energy level equal to or lower than a threshold.

16. The UE of claim 15, wherein the threshold comprises an energy level percentage.

17. The UE of claim 11, wherein the controller is further configured to detect whether sequences designated to one or more priorities are marked on the alarm regions.

18. The UE of claim 17, wherein, when there is no detected sequence or when priorities designated to one or more detected sequences are not higher than the priority of the UE, the controller is further configured to:

mark a sequence designated to a priority of the UE on one or more of the alarm regions, and transmit the communication signal in a transport resource associated with the marked alarm region.

19. The UE of claim 11, wherein the controller is further configured to obtain information indicating a position of the first subframe by reading a system information block (SIB) included within a communication frame before identifying the alarm region.

20. The UE of claim 11, wherein the alarm region is located at one of a first symbol, a first symbol except for a physical downlink control channel (PDCCH), or a last symbol, of the first subframe.

21. The method of claim 8, wherein the transmitting of the communication signal of the UE comprises:

transmitting the communication signal through one of the second subframe and the third subframe related to the second subframe based on a comparison between the priority of the communication signal of the another UE and a priority of the communication signal of the UE.

22. The UE of claim 11, wherein the transmitting of the communication signal of the UE comprises:

transmitting the communication signal through one of the second subframe and the third subframe related to the second subframe based on a comparison between the priority of the communication signal of the another UE and a priority of the communication signal of the UE.

* * * * *